(12) United States Patent
Amaral et al.

(10) Patent No.: US 6,431,553 B1
(45) Date of Patent: Aug. 13, 2002

(54) RADIALLY PRESSURE BALANCED FLOATING SEAL SYSTEM

(75) Inventors: Antonio M. Amaral, East Providence; Stanley J. Olson, Newport, both of RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 3 days.

(21) Appl. No.: 09/652,305

(22) Filed: Aug. 28, 2000

(51) Int. Cl.$^7$ ............................................... F16J 15/54
(52) U.S. Cl. ........................................ 277/580; 277/427
(58) Field of Search ................................. 277/430, 427, 277/516, 579, 580, 587

(56) References Cited

U.S. PATENT DOCUMENTS

| | | | |
|---|---|---|---|
| 2,366,729 A | * 1/1945 | Hanson | 277/516 |
| 3,039,780 A | * 6/1962 | Nordell | 277/540 |
| 3,331,609 A | * 7/1967 | Moran | 277/567 |
| 4,231,579 A | * 11/1980 | Scannell | 277/559 |
| 4,494,760 A | * 1/1985 | Spargo | 277/30 |
| 5,452,904 A | * 9/1995 | Huber et al. | 277/535 |

FOREIGN PATENT DOCUMENTS

| EP | 0 086 002 A1 | * 8/1983 |
|---|---|---|
| GB | 267947 | * 3/1928 |
| GB | 2077369 A | * 12/1981 |

* cited by examiner

Primary Examiner—Anthony Knight
Assistant Examiner—Michael W. White
(74) Attorney, Agent, or Firm—Michael J. McGowan; James M. Kasischke; Prithvi C. Lall

(57) ABSTRACT

A radially pressure balanced floating seal system is used to seal a rotating shaft, such as a drive shaft in a torpedo, or other type of vehicle or machinery. The radially pressure balanced floating seal includes an outer seal housing and an inner seal housing that floats with respect to the outer seal housing. The outer seal housing is secured proximate the shaft bearings, for example, in the tail cone of a torpedo. The inner seal housing is secured within an internal recessed region in the outer seal housing, and two or more discrete torque members or one distributed torque member extend from the outer seal housing to the inner seal housing to prevent rotation of the inner seal housing while allowing movement generally in a radial direction. The inner seal housing includes a lubricant recess formed within an internal annular aperture of the inner seal housing for containing lubricant. Double canted O-rings are disposed on each side of the lubricant recess in double canted O-ring grooves. The double canted grooves and O-rings prevent unbalanced radial forces that might cause rubbing of the shaft against the seal housing. In one embodiment, the lubricant recess is double canted to also minimize the sealing length.

14 Claims, 5 Drawing Sheets

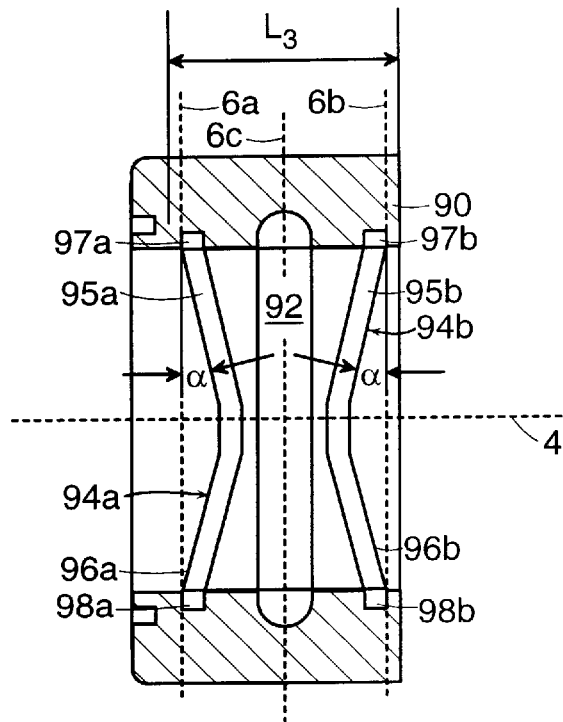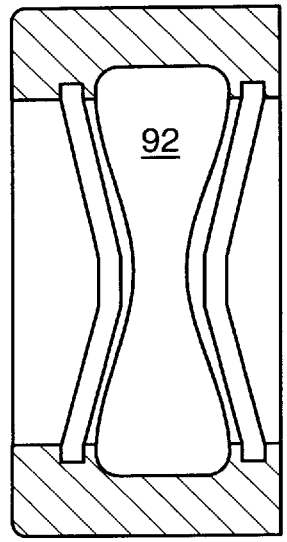
FIG. 5A
FIG. 5B
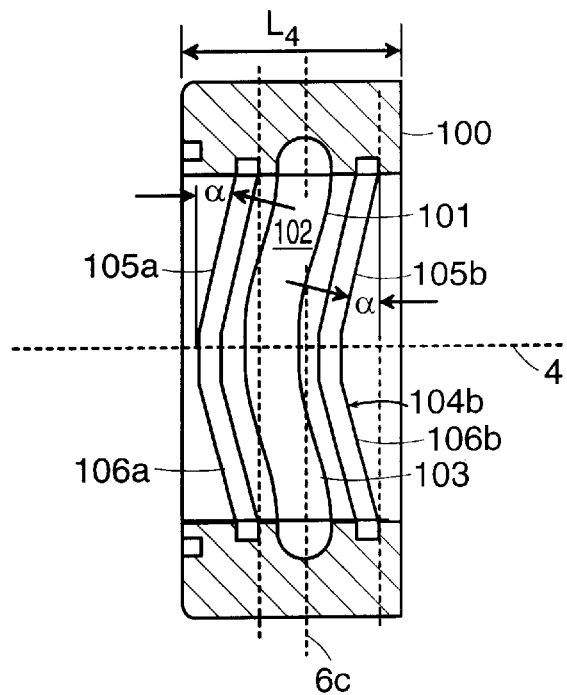
FIG. 6

RADIALLY PRESSURE BALANCED FLOATING SEAL SYSTEM

STATEMENT OF GOVERNMENT INTEREST

The invention described herein may be manufactured and used by or for the Government of the United States of America for governmental purposes without the payment of any royalties thereon or therefore.

CROSS-REFERENCE TO RELATED PATENT APPLICATION

This patent application is co-pending with two related patent applications filed on the same date, entitled: COMPACT DRIVE SHAFT FLOATING SEAL SYSTEM, and AXIALLY PRESSURE BALANCED FLOATING SEAL SYSTEM, both having the same inventors as this patent application.

BACKGROUND OF THE INVENTION (1) Field of the Invention

The present invention relates to sealing assemblies used on rotating shafts and more particularly, relates to a radially pressure balanced floating seal system used on a drive shaft.

(2) Description of the Prior Art

O-ring seals are commonly used to seal rotating shafts used in vehicles or machinery. For example, in an existing torpedo tail cone assembly 10, FIG. 1, the drive shaft 12 of the torpedo is typically sealed with an O-ring seal system having a seal housing 14 and an O-ring seal 15 within a groove in an internal annular surface of the housing 14. The seal housing 14 is located within the tail cone housing 16 near the bearing 18. When the torpedoes have stable and concentric shaft bearing mounts relative to the seal, non-floating seal housings can be used, and these housings will still maintain reasonable clearance to prevent rubbing between the shaft 12 and the seal housing 14. Larger shafts that are mounted soft enough to move or float relative to the seal housing require floating seal housings. The floating seal housing moves with the drive shaft 12 generally in a radial direction as indicated by arrow 2 maintaining clearance of the shaft 12 and preventing the shaft 12 from rubbing against the seal housing 14.

In some types of O-ring sealing systems (not shown), two O-rings are used on each side of a lubricant recess containing oil or another type of lubricant for lubricating the O-ring seals. Canting (or slanting) the O-rings within the seal housing facilitates active lubrication of the seals as the shaft rotates and improves the life span and capability of the seals. In floating seal housings, however, standard canted O-ring seals have resulted in an unbalanced radial or side force on the seal housings. If the system is not axially pressure balanced, the net axial force in a pressurized environment may not permit the. floating seal housing to float freely in the radial direction. Thus, the unbalanced radial or side force often cannot overcome the radial friction force due to axial pressure, and the shaft will rub against the housing when the floating seal housing is unable to float in response to the unbalanced radial force.

SUMMARY OF THE INVENTION

One object of the present invention is a radially pressure balanced seal housing minimizes the potential of rubbing and failure.

Another object of the present invention is a radially pressure balanced seal housing in which the sealing members are effectively lubricated.

A further object of the present invention is a radially pressure balanced seal housing having a minimized seal length.

The present invention features a floating seal system for sealing a rotating shaft. The floating seal system comprises an outer seal housing having an internal recessed region and an inner seal housing received in the internal recessed region. The outer seal housing and the inner seal housing define an aperture for receiving the shaft. The inner seal housing is movable in a generally radial direction with respect to the outer seal housing allowing radial movement of the shaft.

The inner seal housing includes an annular internal surface defining the aperture through the inner seal housing, a lubricant recess formed within the annular internal surface of the inner seal housing for receiving lubricant and for holding the lubricant against the shaft, and first and second sealing members retaining grooves formed within the annular internal surface of the inner seal housing. First and second inner sealing members are disposed within respective first and second sealing member retaining grooves. The first and second sealing member retaining grooves and the first and second inner sealing members are double canted such that the first and second inner sealing members are lubricated by lubricant from the lubricant recess and are radially balanced with respect to the shaft.

In the preferred embodiment, a retaining member coupled to the outer seal housing retains the inner sea[008c] housing within the internal recessed region while allowing the inner seal housing to move in the generally radial direction. An end annular sealing member is disposed between an end face of the inner seal housing and a side of the internal recessed region, for sealing the inner seal housing against the outer seal housing. One or more torque members extend from the outer seal housing into engagement with the inner seal housing for preventing rotation of the inner seal housing relative to the outer seal housing. The inner seal housing preferably includes one or more torque member receiving regions and respective elastomer bushings in the torque member receiving regions for receiving the torque member thus balancing as the sides for radial loading. The torque member receiving regions preferably includes a clearance under the torque members for allowing the inner seal housing to move in the generally radial direction. The at least one torque member can include multiple discrete torque members or one uniformly distributed (360 degree) torque member.

According to the preferred embodiment of the inner seal housing, the first and second sealing member retaining grooves each have a first groove portion and a second groove portion. The first groove portion and the second groove portion of the first sealing member retaining groove each have an end lying in a first radial plane generally orthogonal to an axis of the inner seal housing and form an angle with respect to the first radial plane. The first groove portion and the second groove portion of the second sealing member retaining groove each have an end lying in a second radial plane generally orthogonal to the axis of the inner seal housing and form an angle with respect to the second radial plane.

In one preferred embodiment of the inner seal housing, the lubricant recess lies in a third radial plane generally orthogonal to-the axis of the inner seal housing. In another preferred embodiment, the lubricant recess has a first recessed portion and a second recessed portion. The first recessed portion and the second recessed portion of the lubricant recess each have an end lying in a third radial plane generally orthogonal to the axis of the inner seal housing and form an angle with respect to the third radial plane. The first recessed portion and the first groove portions of the first and second sealing member retaining grooves are generally parallel, and the second recessed portion and the second groove portions of the first and second sealing member retaining grooves are generally parallel.

BRIEF DESCRIPTION OF THE DRAWINGS

These and other features and advantages of the present invention will be better understood in view of the following description of the invention taken together with the drawings wherein:

FIGS. 5A–5B are cross-sectional views of inner seal housings having double canted O-ring grooves, according to two embodiments of the present invention;

FIG. 6 is a cross-sectional view of an inner seal housing having double canted O-ring grooves and a double canted lubricant recess, according to another embodiment of the present invention.

DESCRIPTION OF THE PREFERRED EMBODIMENT

Figure 1:
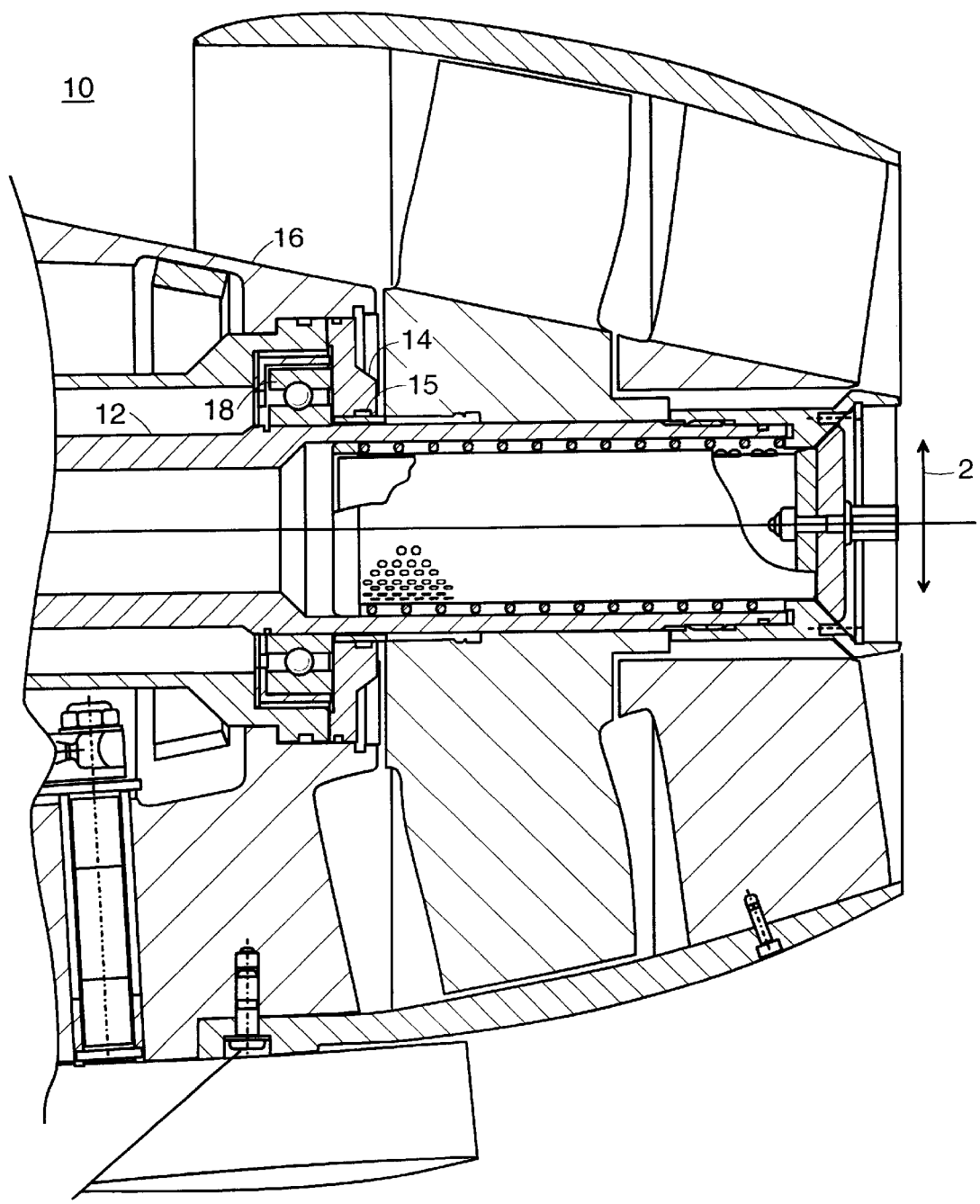
FIG. 1 is a cross-sectional view of a torpedo tail cone assembly having an O-ring seal system for sealing a drive shaft according to the prior art.
Figure 2:
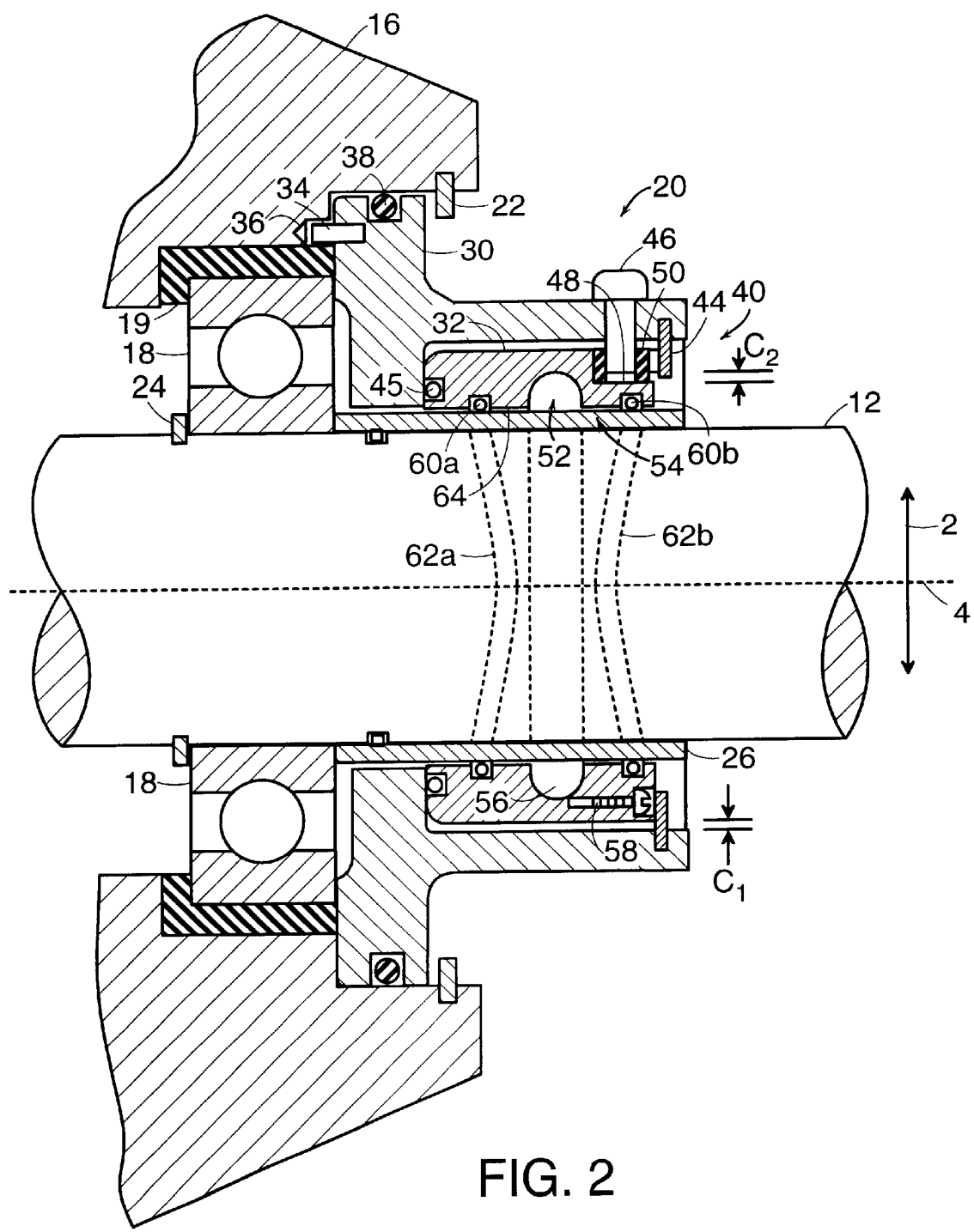
FIG. 2 is cross-sectional view of a radially pressure balanced floating seal system according to the present invention.

A radially pressure balanced floating seal system 20, FIG. 2, according to the present invention, is used to seal a rotating shaft 12 while allowing movement of the shaft in a radial direction 2. In one example, the floating seal system 20 is assembled in a tail cone housing 16 of a torpedo proximate the shaft bearings 18, which are preferably mounted in a resilient elastomer 19. The floating seal system 20 is held in place by a spiral ring 22 or other similar retaining member or mechanism, and the bearings 18 are held in place by a retaining ring 24 or other similar retaining member or mechanism. A seal ring 26 made of ground and polished, hard, chrome-plated, stainless steel or alternative compatible material is preferably disposed around the shaft 12 and between the shaft 12 and the floating seal system 20. The present invention contemplates other uses for the floating seal system 20 in other types of vehicles or with rotating shafts in other types of machines.

The floating seal system 20 includes an outer seal housing and an inner seal housing 32 that "floats" relative to the outer seal housing 32. The outer seal housing 30 and inner seal housing 32 are preferably made of anodized aluminum or other compatible material and the radial wall thickness of the inner seal housing 32 is in the range of about 0.6 inches depending on the application. One or more pins 34 or other similar members extend from the outer seal housing 30 to a pocket 36 in the tail cone housing 16 to prevent rotation of the outer seal housing 30 relative to the tail cone housing 16. An outer O-ring 38 or other type of sealing member is preferably placed between the outer seal housing 30 and the tail cone housing 16.

The outer seal housing 30 includes an internal recessed region 40, for receiving the inner seal housing 32, such that the outer and inner seal housings 30, 32 form a shaft receiving aperture that receives the rotating shaft 12. The inner seal housing 32 is movable generally in the radial direction 2 with respect to the outer seal housing 30 to allow radial movement of the shaft 12. The inner seal housing 32 is preferably retained within the outer seal housing 30 with a retaining ring 44 or other similar retaining member or mechanism. An end O-ring 45 or other type of sealing member is preferably disposed between an end face of the inner seal housing 32 and a wall of the internal recessed region 40 for sealing the inner seal housing 32 with respect to the outer seal housing 30.

Two or more equally loaded torque members 46 extend from the outer seal housing 30 to engage the inner seal housing 32 and prevent rotation of the inner seal housing 32 while allowing the inner seal housing 32 to move radially. In the exemplary embodiment, the torque member(s) 46 include tabs, bolts, or pins that are inserted into a respective torque member receiving region or recess 48 in the inner seal housing 32. An elastomer bushing 50 is preferably disposed within each recess 48. The elastomer bushings 50 preferably have a relatively low compression and shear spring rate. These are application dependent and are compared with the lateral or side spring rates of O-rings 60a and 60b. Load is spread equally by the sealing torque from the shaft. This results in minimal side forces on the inner seal housing 32 as a result of the torque and/or as a result of the off-set displacements of the shaft 12 compared to the outer seal housing 30, and also reduces lateral compression of O-rings 60a and 60b. This minimizes the chance of housing 32 rubbing on seal ring 54. The clearance $C_1$ between the inner seal housing and outer seal housing and the clearance $C_2$ beneath the torque member(s) 46 are designed to exceed the maximum eccentricity of the shaft centerline or axis 4 and are preferably in a range of about 0.06 to 0.09 inches depending on the design application.

The inner seal housing 32 further includes a lubricant recess 52 formed within an internal annular surface 54 of the inner seal housing 32 for containing oil or other lubricant. A first hole 56 is used to inject the oil into the recess 52 (e.g., to about 60 to 70% full) and is sealed with a self sealing plug 58 or other sealing mechanism. A second hole (not shown) can also be provided for venting during filling through the first hole 56.

Inner O-rings 60a, 60b or other similar sealing members are disposed on each side of the lubricant recess 52 in O-ring grooves 62a, 62b. Preferably, only the O-rings 60a, 60b touch the seal ring 26 around the shaft 12, and the O-rings 60a, 60b cause the inner seal housing 32 to radially position itself. The floating seal system 20 example shown here is also an axially pressure balanced to minimize friction between the side O-ring 45 and the wall of the internal recessed region 40 and to allow the inner seal housing 32 to radially align itself even under it pressure. The system is substantially axially pressure balanced because the inner seal housing 32 is surrounded by environmental pressure on the outside surfaces including the ends. O-ring 45 seals the inner 32 and outer 30 housing interface. O-ring 60b seals at a slightly smaller diameter than O-ring 45. This results in a nearly, but not completely, axially pressure balanced system. Clearance between the internal annular surface 54 of the inner seal housing 32 and the seal ring 26 around the shaft 12 is determined by the maximum pressure to be sealed. In one example, this clearance is about 0.008 in. radially at 620 psi. The 0.008 inch radial clearance is required to clear the shaft yet prevent extrusion of the O-rings at pressure and is design dependent. A low friction material 64 can be used on the internal annular surface 54 in the lubricated area as well as outside the lubricated area to prevent galling during any unintended contact. Examples of low friction material 64 include a plain bearing material, self lubricating material,. and/or integral low friction coatings.

The O-rings 60a, 60b and O-ring grooves 62a, 62b are preferably double canted so that the lubricant in the lubricant recess 52 actively lubricates the O-rings and so that the inner seal housing 32 is radially balanced. An inner seal housing 70, FIG. 3, having a lubricant recess 72 and straight sealing grooves 74a, 74b parallel to the lubricant recess 72 is radially by balanced. However, the O-rings 76a, 76b in the straight grooves 74a, 74b are not actively lubricated by the lubricant in the lubricant recess 72 as the shaft 12 rotates within the inner seal housing 70. The straight sealing grooves 74a, 74b minimize the overall sealing length L, for given shoulder lengths T and widths of grooves 74a, 74b and lubricant recess 72. Minimizing the sealing length $L_1$ is advantageous for applications that have a limited space to install shaft seals.

Figure 3:
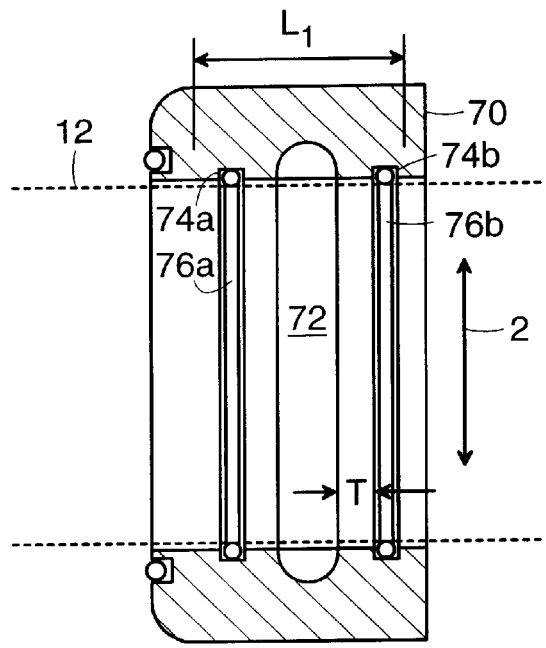
FIG. 3 is a cross-sectional view of an inner, floating seal housing having straight or uncanted O-ring grooves.
Figure 4:
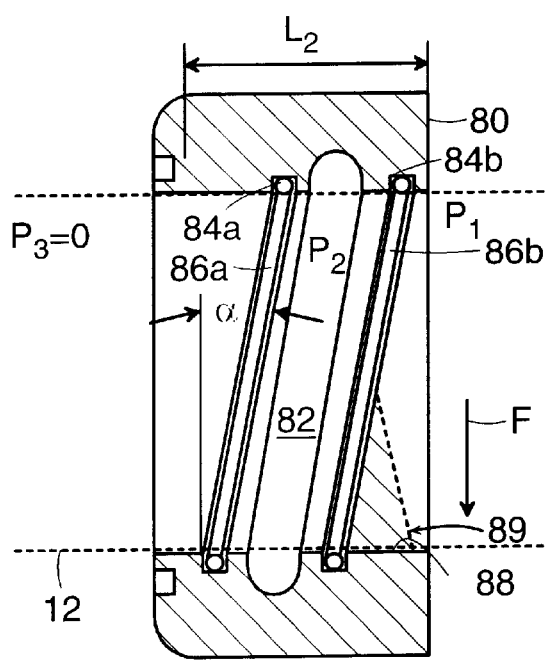
FIG. 4 is a cross-sectional view of an inner, floating seal housing having standard canted O-ring grooves.

An inner seal housing 80, FIG. 4, having simple canted (or slanted) lubricant recess 82 and O-ring grooves 84a, 84b permits better lubrication than the straight O-rings shown in FIG. 3 as the shaft 12 rotates. However, the canted O-rings 86a, 86b expose the housing 80 to unbalanced asymmetric radial pressure and require a longer sealing length $L_2$. Because the pressure $P_1$ outside of the seal is greater that the pressures $P_2$ and $P_3$, the canting of the O-rings 86a, 86b results in a net radial side force F that places pressure on the internal surface 88 of the housing 80 in the region 89 beneath the O-ring 86b when assembled on the shaft 12. This net radial side force F can overcompress the O-rings 84a, 84b and cause the shaft 12 to rub on the internal surface 88 of the inner seal housing 80.

One preferred embodiment of the inner seal housing 90, FIGS. 5A–5B, includes a lubricant recess 92 and first and second double canted O-ring grooves 94a, 94b. Each of the double canted O-ring grooves 94a, 94b include first groove portions 95a, 95b and second groove portions 96a, 96b that are symmetric with respect to the axis 4. The first and second groove portions 95a, 96a of the first O-ring groove 94a each have a point 97a, 98a that lies in a first radial plane 6a generally orthogonal to the axis 4 of the housing 90. The first and second groove portions 95a, 96a form an angle α with respect to the first radial plane 6a. The angle α is preferably less than twice the standard canted angler for example, in the range of no more than 4°0 to 10°. This will permit sufficient axial sweep speed and proper geometry for re-lubrication of the O-ring surface. Similarly, the first and second groove portions 95b, 96b of the second O-ring groove 94b each have a point 97b, 98b that lies in a second radial plane 6b generally orthogonal to the axis 4 of the housing 90, and the first and second groove portions 95b, 96b form an angle α with respect to the second radial plane 6b.

In this embodiment, the lubricant recess 92 is generally straight (i.e., uncanted) (FIG. 5A) or shaped to maximize volume (FIG. 5B) and generally lies in a third radial plane 6c between the first and second double canted O-ring grooves 94a, 94b. Because each of the double canted O-ring grooves 94a, 94b having symmetrical first and second groove sections 95a, 96a, 95b, 95a, the pressure areas are symmetric and the net radial side force is zero.

Another preferred embodiment of the inner sealing housing 100, FIG. 6, includes a double canted lubricant recess 102 as well as first and second double canted O-ring grooves 104a, 104b. The double canted lubricant recess 102 includes first and second lubricant recess sections 101, 103 that form an angle α with respect to the third radial plane 6c. The first groove sections 105a, 105b are generally parallel to the first lubricant recess section 101, and the second groove sections 106a, 106b are generally parallel to the second lubricant recess section 103. This double canted arrangement of the lubricant recess 102 and the O-ring grooves 104a, 104b provides active lubrication and radial pressure balancing, while also further minimizing the sealing length $L_4$ as compared to the inner sealing housing 90 having the straight, uncanted lubricant recess 92 (FIG. 5).

Figure 7:
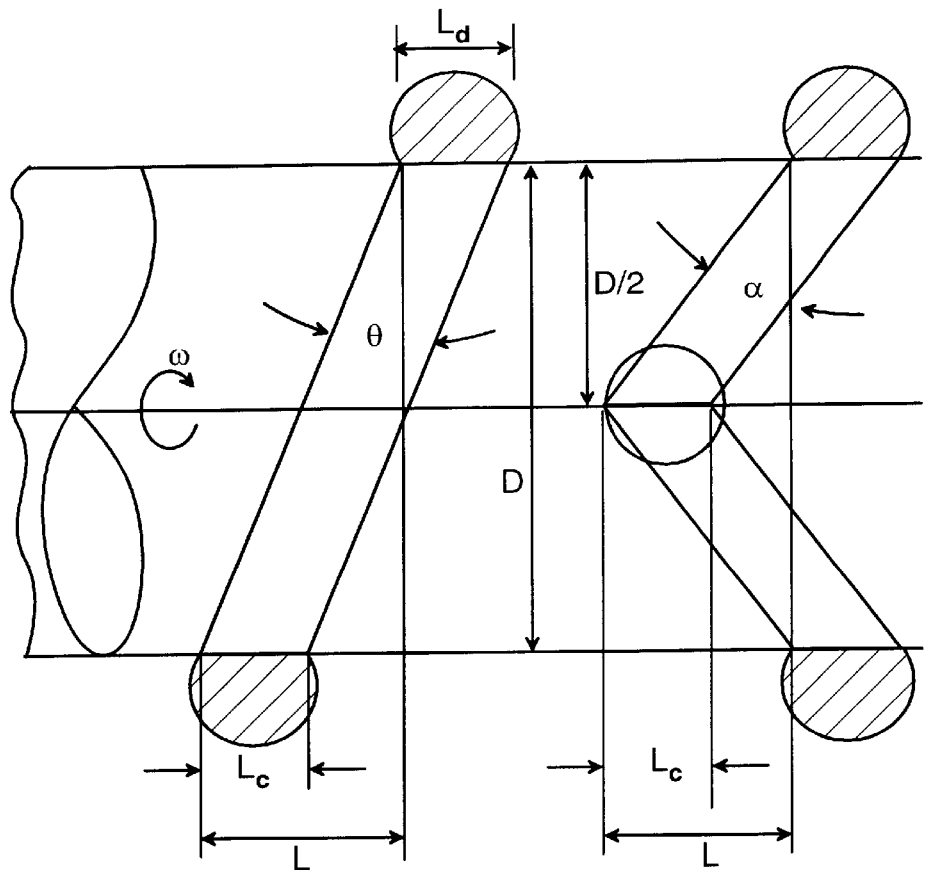
FIG. 7 is a comparative layout of double and single canted O-rings and defined variables.

Double canted O-rings have several considerations that must be addressed when implementing them in place of single canted O-rings. The geometry and variables are shown in FIG. 7. The contact surface length, $L_c$, of the O-ring on the shaft surface is equal to or less than the O-ring width, $L_d$, and depends upon the squeeze and hardness of the O-ring.

Both double and single canted O-rings require sufficient cant angle to produce at least the minimum required reciprocating speed in addition to providing the proper geometry for contact surface lubrication during rotation. The standard canting angle, θ, is designed primarily to provide an average axial sweep rate of the O-ring along the shaft surface in one revolution of the shaft. It is preferred that this sweep rate results in a relative minimum movement of the O-ring along the shaft of at least 20 ft/min in order to minimize the static friction effects (called stiction) on the O-ring as it stops and starts its sinusoidal sliding along the shaft.

The cant angle should also permit reasonable re-lubrication of the O-ring contact surface at each revolution of the shaft. This occurs as L>$L_c$ and lubricant can more readily contact more O-ring surface area during each revolution. The design cant angle for the single or double cases should use the largest angle of the two design requirements. Orientation of the canted O-rings relative to gravity is not important since churning of the nearly full oil chamber ensures a full film on the shaft surface at all times.

The equation below describes the sweep rate relationships for the single canted O-ring:

| | | |
|---|---|---|
| MRS1 = 2(D) (Tan θ) (ω) (ft/12 in) ≧ 20 ft/min | | (1) |
| Where: | Tan θ = L/D | (2) |
| | MRS1 = the minimum reciprocating speed in feet per minute for single cant O-rings | |
| Thus: | MRS1 = 2(L) (ω) (ft/12 in) ≧ 20 ft/min | (3) |

The two design criteria for a single cant angle are discussed below in further detail. First, the angles required for the sweeping rates are described. When using a single canted O-ring, the O-ring sweeps fully forward and aft from its original position in one revolution. The single canted angle, θ, is generally provided at 2 to 5 degrees depending on the specific application and design.

Secondly, the angles required for proper lubrication of the O-ring surface are described. From FIG. 7, it can be seen that the minimum angle, θ, would occur when L=$L_c$. It is preferred to have L>$L_c$ to provide superior lubrication. The cant angle that is chosen by the designer, in conjunction with the minimum sweep speed requirements, may be large enough to also ensure proper lubrication.

The equation below describes the sweep rate relationships for the double canted O-ring:

$$MRS2 = 4(D)(\tan\theta)(\omega)(\text{ft}/12\text{ in}) \geq 20 \text{ ft/min} \quad (4)$$

Where: $\tan\theta = 2L/D$ (5)

MRS2 = the minimum reciprocating speed in feet per minute for double cant O-rings Thus: $MRS2 = 8(L)(\ )(\text{ft}/12\text{ in})\ 20 \text{ ft/min}$ (6)

The two design criteria for double cant angle O-rings are discussed below in further detail. First, the double canted O-ring of the current invention sweeps back and forth fully twice each shaft revolution. Thus, the required cant angle, for the double canted O-ring is nominally only one half that of for the single cant to produce the required minimum sweep rate to avoid stiction.

Secondly, the cant angle, , must be large enough to lubricate the O-ring contact surface on each half revolution or twice during each full sweep of the O-ring. The double canted O-ring will require only one-half a revolution for lubrication, while the single canted O-ring requires a full revolution. Again, the cant angle that is chosen by the designer, in conjunction with the minimum sweep speed requirements, may be large enough to also ensure proper lubrication.

Accordingly, the present invention provides a radially pressure balanced floating seal system that eliminates unbalanced canted O-rings that cause net radial side forces and rubbing of the shaft on the seal housing. The radially balanced floating seal system of the present invention also actively lubricates the seals and minimizes the sealing length.

In light of the above, it is therefore understood that within the scope of the appended claims, the invention may be practiced otherwise than as specifically described.

What is claimed is:

1. A floating seal system for sealing a rotating shaft, said floating seal system comprising:

an outer seal housing having an internal recessed region;

an inner seal housing received in said internal recessed region, said outer seal housing and said inner seal housing defining an aperture for receiving said shaft, and said inner seal housing being movable in a generally radial direction with respect to said outer seal housing for preventing transmission of radial movement of said shaft to said outer seal housing, said inner seal housing including:

an annular internal surface defining said aperture through said inner seal housing;

a lubricant recess formed within said annular internal surface of said inner seal housing for receiving lubricant and for holding said lubricant against said shaft; and first and second sealing member retaining grooves formed within said annular internal surface of said inner seal housing; and first and second inner sealing members disposed within respective said first and second sealing member retaining grooves, wherein said first and second sealing member retaining grooves and said first and second inner sealing members are double canted such that said first and second inner sealing members are lubricated by lubricant from said lubricant recess and are radially balanced with respect to said shaft.

2. The floating seal system of claim 1 further comprising a retaining member, coupled to said outer seal housing, said retaining member retaining said inner seal housing within said internal recessed region while allowing said inner seal housing to move in said generally radial direction.

3. The floating seal system of claim 1 further comprising an end annular sealing member disposed between an end face of said inner seal housing and a side of said internal recessed region, for sealing said inner seal housing against said outer seal housing.

4. The floating seal system of claim 1 further comprising at least one torque member extending from said outer seal housing into engagement with said inner seal housing for preventing rotation of said inner seal housing relative to said outer seal housing.

5. The floating seal system of claim 4 wherein said inner seal housing includes at least one torque member receiving region formed therein, said inner seal housing further comprising at least one elastomer bushing positioned in said torque member receiving region for receiving said torque member.

6. The floating seal system of claim 5 wherein each said at least one torque member receiving region has a clearance under said torque member for allowing said inner seal housing to move in said generally radial direction.

7. The floating seal system of claim 1 wherein said first and second sealing member retaining grooves each have a first groove portion and a second groove portion, wherein said first groove portion and said second groove portion of said first sealing member retaining groove each have an end lying in a first radial plane generally orthogonal to an axis of said inner seal housing and form an angle with respect to said first radial plane, and wherein said first groove portion and said second groove portion of said second sealing member retaining groove each have an end lying in a second radial plane generally orthogonal to an axis of said inner seal housing and form an angle with respect to said second radial plane.

8. The floating seal system of claim 7 wherein said lubricant recess lies in a third radial plane generally orthogonal to said axis of said inner seal housing.

9. The floating seal system of claim 7 wherein said lubricant recess has a first recess portion and a second recess portion, wherein said first recess portion and said second recess portion of said lubricant recess each have an end lying in a third radial plane generally orthogonal to an axis of said inner seal housing and form an angle with respect to said third radial plane, wherein said first recess portion and said first groove portions of said first and second sealing member retaining grooves are generally parallel, and wherein said second recess portion and said second groove portions of said first and second sealing member retaining grooves are generally parallel.

10. The floating seal system of claim 1 further comprising a seal ring for placement around said shaft, wherein said first and second inner seal members contact said seal ring.

11. The floating seal system of claim 10 further comprising a low friction coating on said annular internal surface of said inner seal housing, for contacting said seal ring.

12. The floating seal system of claim 1 wherein said inner seal housing is axially pressure balanced.

13. The inner seal housing of claim 11 wherein said lubricant recess lies in a third radial plane generally orthogonal to an axis of said inner seal housing.

14. The inner seal housing of claim 11 wherein said lubricant recess has a first recess portion and a second recess portion, wherein said first recess portion and said second recess portion of said lubricant recess each have an end lying in a third radial plane generally orthogonal to said inner seal housing and form an angle with respect to said third radial plane, wherein said first recess portion and said first groove portions of said first and second sealing member retaining grooves are generally parallel, and wherein said second recess portion and said second groove portions of said first and second sealing member retaining grooves are generally parallel.

* * * * *